(12) United States Patent
Herstrom et al.

(10) Patent No.: US 9,093,815 B2
(45) Date of Patent: Jul. 28, 2015

(54) OPTICAL FIBER AMPLIFIER INCLUDING RARE-EARTH-DOPED CLADDING REGION

(71) Applicant: OFS Fitel, LLC, Norcross, GA (US)

(72) Inventors: Soren Herstrom, Ballerup (DK); Kwang S Kim, Red Bank, NJ (US); Bera Palsdottir, Copenhagen (DK); Gabriel Puc, Lebanon, NJ (US); Thierry F Taunay, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 14/011,069

(22) Filed: Aug. 27, 2013

(65) Prior Publication Data

US 2014/0063594 A1    Mar. 6, 2014

Related U.S. Application Data

(60) Provisional application No. 61/694,347, filed on Aug. 29, 2012.

(51) Int. Cl.
*H01S 3/067*    (2006.01)
*G02B 6/036*    (2006.01)
*H01S 3/16*    (2006.01)

(52) U.S. Cl.
CPC .......... *H01S 3/0672* (2013.01); *G02B 6/03627* (2013.01); *H01S 3/06716* (2013.01); *H01S 3/06733* (2013.01); *H01S 3/06754* (2013.01); *H01S 3/1608* (2013.01); *H01S 3/1611* (2013.01); *H01S 3/1618* (2013.01); *H01S 3/1695* (2013.01)

(58) Field of Classification Search
CPC ............. G02B 6/0327; G02B 6/03627; G02B 6/02366; H01S 3/0672
See application file for complete search history.

(56) References Cited

U.S. PATENT DOCUMENTS

| | | | | |
|---|---|---|---|---|
| 4,959,837 A * | 9/1990 | Fevrier et al. | ...................... | 372/6 |
| 5,381,503 A * | 1/1995 | Kanamori et al. | ............. | 385/123 |
| 5,712,941 A * | 1/1998 | Imoto et al. | ................... | 385/126 |
| 6,288,835 B1 * | 9/2001 | Nilsson et al. | ............. | 359/341.3 |
| 6,480,659 B1 * | 11/2002 | Patlakh et al. | ................ | 385/125 |
| 6,483,974 B1 * | 11/2002 | Waarts | .......................... | 385/123 |
| 6,690,868 B2 * | 2/2004 | Anderson et al. | ............. | 385/123 |
| 7,221,838 B2 | 5/2007 | Jakobsen et al. | | |
| 7,570,856 B1 * | 8/2009 | Minelly et al. | ................ | 385/126 |
| 7,865,050 B1 * | 1/2011 | Sun | ................................ | 385/123 |
| 8,259,389 B2 | 9/2012 | Pastouret et al. | | |
| 8,412,015 B2 * | 4/2013 | Digiovanni et al. | .......... | 385/127 |
| 8,520,299 B2 * | 8/2013 | Digiovanni et al. | ....... | 359/341.3 |
| 2002/0114600 A1 * | 8/2002 | Aiso et al. | ...................... | 385/123 |
| 2002/0141716 A1 * | 10/2002 | Lysiansky et al. | ............. | 385/123 |
| 2002/0186944 A1 * | 12/2002 | Riant et al. | ..................... | 385/127 |
| 2003/0024276 A1 * | 2/2003 | Anderson et al. | ............... | 65/390 |

(Continued)

*Primary Examiner* — Ari M Diacou
(74) *Attorney, Agent, or Firm* — Wendy W. Koba, Esq.

(57) ABSTRACT

A rare earth doped optical fiber amplifier is configured to have an enlarged core region and a trench formed adjacent to the core, where at least an inner portion of the trench is also formed to include a rare earth dopant. The presence of the rare earth dopant in the inner region of the cladding minimizes transient power fluctuations within the amplifier as the number of optical signals being amplified changes. The addition of rare earth dopant to the cladding increases the overlap between the pump, signal and the rare earth ions and thus improves the gain efficiency for the optical signal. The relatively large core diameter increases the saturation power level of the rare earth dopant and decreases the transients present in the gain as the input signal power fluctuates.

7 Claims, 4 Drawing Sheets

(56) References Cited

U.S. PATENT DOCUMENTS

| | | | |
|---|---|---|---|
| 2003/0142937 A1* | 7/2003 | Collier et al. | 385/123 |
| 2004/0247272 A1* | 12/2004 | Dawson et al. | 385/127 |
| 2010/0189137 A1* | 7/2010 | Shkunov et al. | 372/6 |
| 2011/0064095 A1* | 3/2011 | Gapontsev et al. | 372/6 |
| 2011/0116160 A1 | 5/2011 | Boivin et al. | |
| 2012/0224254 A1 | 9/2012 | Burov et al. | |
| 2012/0287498 A1* | 11/2012 | Traynor et al. | 359/341.3 |
| 2014/0212103 A1* | 7/2014 | Taunay | 385/127 |

\* cited by examiner

OPTICAL FIBER AMPLIFIER INCLUDING RARE-EARTH-DOPED CLADDING REGION

CROSS-REFERENCE TO RELATED APPLICATIONS

This application claims the benefit of U.S. Provisional Application No. 61/694,347, filed Aug. 29, 2012 and herein incorporated by reference.

TECHNICAL FIELD

The present invention relates to a rare earth doped optical fiber amplifier and, more particularly, to a rare earth doped optical fiber having an enlarged core region and an inner cladding trench that is also doped with a rare earth material to minimize transient power fluctuations within the amplifier as the number of optical signals being amplified changes.

BACKGROUND OF THE INVENTION

Rare earth doped optical fiber amplifiers (such as, for example, erbium-doped fiber amplifiers) are widely used in a variety of optical communication systems, including wavelength division multiplexed (WDM) networks where different network channels utilize different wavelengths. In a typical communication network, channels may be added or dropped, depending on the volume of traffic passing through the network, outages or the like. When this happens in the optical domain, the cumulative optical power passing through an erbium-doped fiber amplifier changes, which causes a change in the amplification of the signals currently passing through the amplifier.

While there are a variety of schemes well known in the art for addressing some of the power fluctuation problems associated with doped fiber amplifiers, these schemes cannot provide an "instantaneous" smoothing to the amplification of those signals still passing through the fiber amplifier. Thus, some transients in the amplification still occur and degrade the performance of the transmission network.

Thus, it is desired to provide a doped fiber amplifier that is less sensitive to power fluctuations that occur as a transmission network is re-configured (e.g., add/drop of channels).

SUMMARY OF THE INVENTION

The needs remaining in the art are addressed by the present invention, which relates to a rare earth doped optical fiber amplifier and, more particularly, to a rare earth doped optical fiber having an enlarged core region and a trench formed adjacent to the core, where at least an inner portion of the trench is also formed to include a rare earth dopant so as to minimize transient power fluctuations within the amplifier as the number of optical signals being amplified changes.

In one embodiment, the present invention takes the form of an amplifying optical fiber comprising a rare-earth-doped core region of a diameter d greater than 3.0 µm and exhibiting a first refractive index value $n_{core}$. A trench is formed to surround the core region and exhibit a second refractive index value $n_{trench} \ll n_{core}$, with at least an inner portion of the trench also doped with a rare earth material. A cladding is disposed to surround the trench and has a third refractive index value $n_{clad} > n_{trench}$.

The presence of the rare earth material within the inner portion of the trench increases the overlap between the pump signal and the rare earth ions and thus improves the gain efficiency for the optical signal. The relatively large core diameter increases the saturation power level of the rare earth dopant, which decreases the transients present in the gain as the input signal power fluctuates.

In situations where the presence of the rare earth dopant in the trench portion of the cladding raises the refractive index value of the trench to an undesirable level, a counter-acting dopant (such as fluorine) may be added to lower the value of $n_{trench}$.

Other and further aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

One known technique for reducing the change in gain in a doped fiber amplifier is to increase the saturation power level of the amplifier ($P_{sat}$). In particular, when a doped fiber is designed to increase its $P_{sat}$ value, this will reduce the rate of change of the gain (dG/dt) within the amplifier (dG/dt being a measure of the transient condition), since dG/dt is inversely proportional to $P_{sat}$.

$$\frac{dG}{dt} \propto \frac{1}{\tau P_{sat}} \propto \frac{\Gamma}{A}$$

$$P_{sat} = \frac{Ah\nu}{(\sigma_e + \sigma_a)\tau \Gamma}$$

where A is the effective rare-earth-doped cross-sectional area, $\Gamma$ is the overlap factor between the rare earth ions, the optical pump and optical signal, $\sigma_e$ and $\sigma_a$ are the average emission and absorption coefficients, respectively, for the doped fiber and $\tau$ is the lifetime of the rare earth ion. In accordance with the present invention, the objective is to reduce the value of dG/dt. Therefore, increasing $P_{sat}$ is one way to obtain this objective.

As clearly seen by these relations, $P_{sat}$ can be increased by increasing the rare-earth-doped cross section (A) of the fiber core and/or by modifying the distribution profile of the rare earth ions in the fiber core. However, implementing such changes adversely affects most (if not all) of the other properties of the doped fiber amplifier.

The present invention addresses these concerns and also provides a design that minimizes the transient problem related to the fluctuations of the optical gain in a rare-earth-doped fiber amplifier. As will be discussed below, the configuration of the present invention may also improve other amplifier characteristics, such as power conversion efficiency (PCE) and/or splice loss at the signal and pump wavelengths. In particular, the configuration of the present invention may achieve a higher PCE value than possible with conventional doped fiber amplifiers, as a result of increasing the diameter of the core region. During the course of the following discussion, the example of using erbium as the rare earth dopant will be mentioned. The use of erbium is considered to be exemplary only, since any of the rare earth elements (i.e., ytterbium, neodymium, etc.) also exhibit the ability to use a pump signal to create gain in a propagating optical signal.

Figure 1:
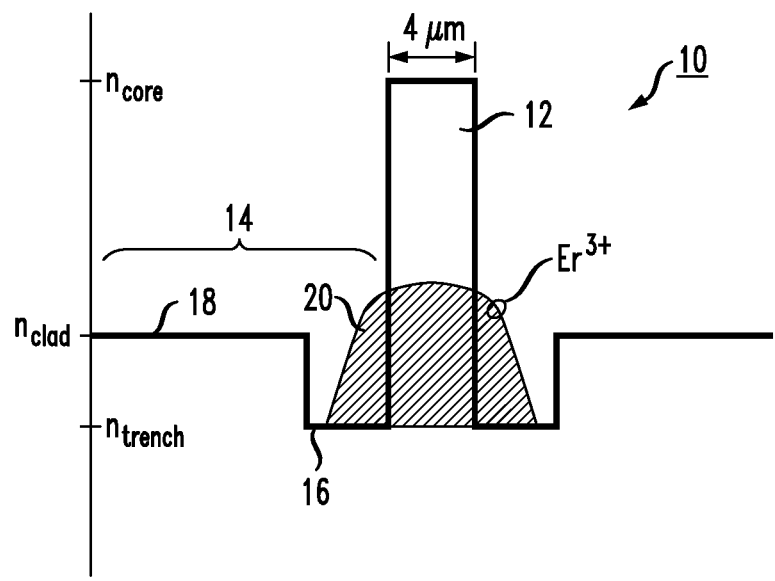
FIG. 1 is an exemplary refractive index profile of a doped fiber amplifier formed in accordance with the present invention.

FIG. 1 is refractive index profile of an exemplary rare-earth-doped optical fiber 10 formed in accordance with the present invention. As shown, an aspect of embodiments of the invention is the inclusion of a trench in the cladding region of the fiber design. Additionally, embodiments of the present invention utilize a fiber with a core diameter that is greater than the dimension typically associated with conventional doped fiber amplifiers. In particular, doped fiber 10 is shown to include a core region 12 that is surrounded by a cladding configuration 14 that includes an inner trench 16 and an outer cladding 18. In comparison to conventional rare-earth-doped fibers that have a core diameter on the order of about 3 μm, a doped fiber formed in accordance with the present invention preferably includes a core with a minimum diameter of 4 μm, and possibly extending to a diameter of about 10 μm as will be described below in association with FIG. 2.

With reference to FIG. 1, core region 12 is shown as having a refractive index difference (denoted Δn) of about 0.025. At times, this will also be defined as $n_{core}$. In most cases, core region 12 is doped with germanium and a rare-earth material (such as erbium, ytterbium, etc.). In this case, core region 12 is shown has having a diameter on the order of 4 μm.

The Δn of trench 16 ($n_{trench}$) is shown as being on the order of approximately −0.012, where it is obvious that $n_{trench} \ll n_{core}$. In this specific embodiment, trench 16 is formed to have a width of about 2 μm. Other values are possible, as will be evident from reviewing Table I as shown below.

In accordance with the present invention, at least an inner portion 20 of trench 16 is also doped with a rare earth material. By including some level of dopant in portion 20, the overlap Γ between the dopant ions, pump and optical signal is increased (by as much as 20% in some cases), since the 'tail' region of the pump will interact with the dopant ions and provide additional gain to the optical signal.

Figure 2:
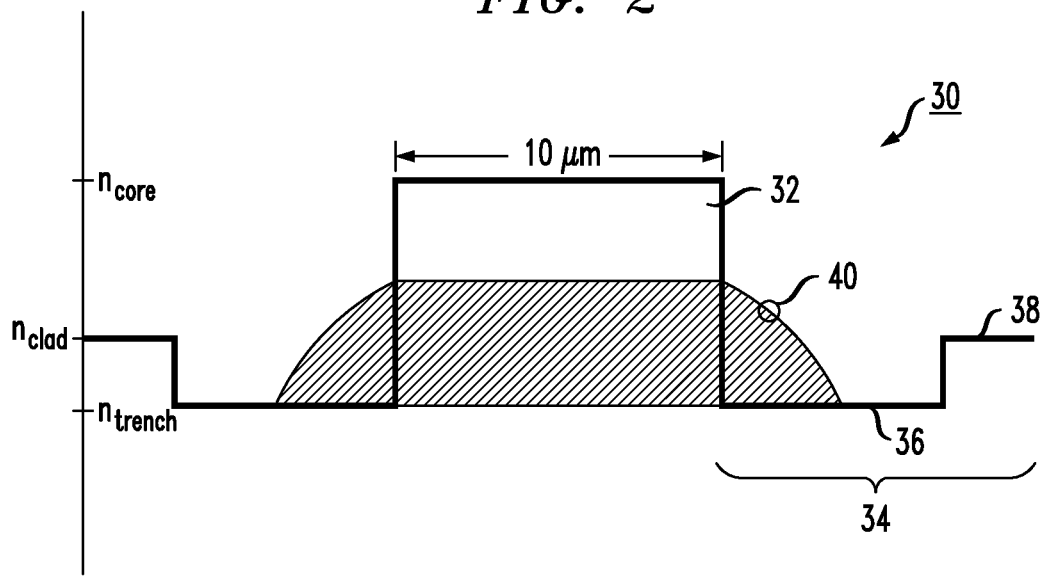
FIG. 2 is an exemplary refractive index profile of an alternative configuration of a doped fiber amplifier formed in accordance with the present invention.

FIG. 2 illustrates another exemplary embodiment of the present invention, in the form of a refractive index profile for a rare-earth-doped fiber that has a relatively large core diameter. In particular, a rare-earth-doped fiber 30 is shown to comprise a core region 32 and a cladding 34 comprising a trench 36 and outer cladding layer 38. Core region 32, which is doped to contain both germanium and a rare earth material (such as erbium) is shown as have a large core diameter, on the order of 10 μm, with a refractive index difference ($n_{core}$) Δn of about 0.007. Trench 36 is shown as having a width approaching 10 μm as well, with an $n_{trench}$ of −0.003. An exemplary diagram of rare earth dopant concentration is also shown in FIG. 2, illustrating the inclusion of the dopant within an inner portion 40 of trench 36.

While these two arrangements are exemplary of the parameters of a rare-earth-doped fiber formed in accordance with the present invention, it is to be understood that various other combinations of core diameter, trench width and rare earth dopant concentration (within both the core and inner portion of the trench) can be created and used to minimize the presence of gain fluctuations in accordance with the present invention. Table I, shown below, is considered to represent an exemplary set of conditions suitable for a rare-earth-doped fiber of the present invention:

TABLE I

|  |  | Core | Trench |
|---|---|---|---|
| Index Difference Δn | Max | 0.025 | −0.003 |
|  | Min | 0.007 | −0.012 |
| Diameter/Width (μm) | Max | 10 | 10 |
|  | Min | 4 | 2 |
| $LP_{11}$ (nm) | Min | 800 |  |
|  | Max | 1500 |  |

In accordance with the present invention, the increase in the core diameter (with respect to prior art doped fiber configurations) raises the saturation power level of the fiber amplifier, thereby reducing the rate of change in the signal gain, as discussed above. The wider core reduces the erbium ion-ion interactions. The size of the doped portion of the trench increases the Γ overlap factor for a given core diameter, leading to an increase in the absorption per unit length as defined in the equation below:

$$\alpha(\lambda) = \sigma_a(\lambda)\Gamma(\lambda)N,$$

where α is the absorption and N is the average density of the rare-earth dopant.

Figure 3:
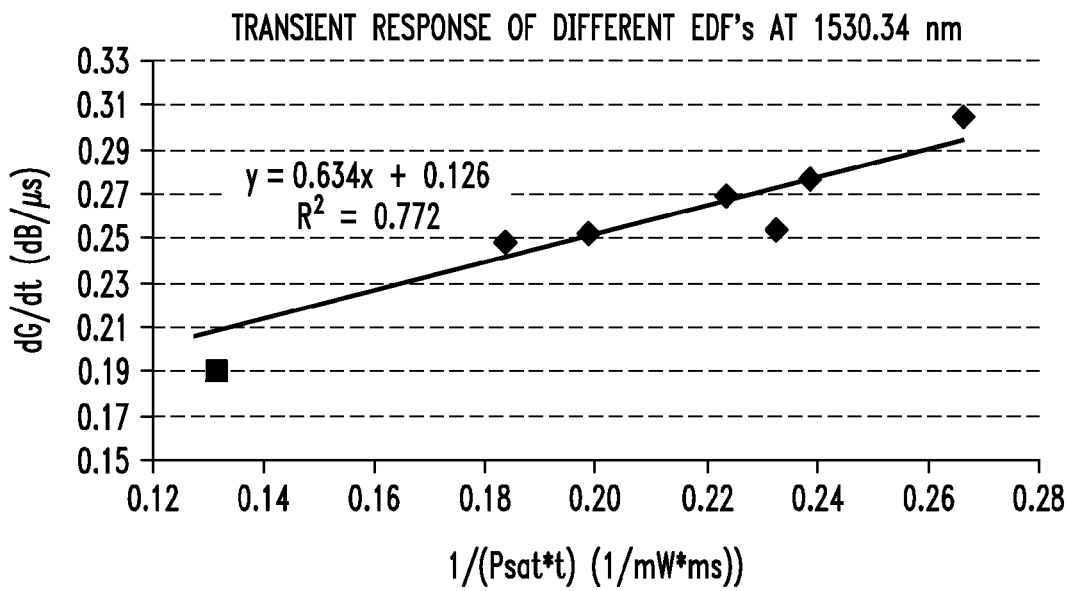
FIG. 3 is a plot of a transient response for rare-earth-doped fibers as a function their associated saturated power values.

FIG. 3 is a plot of transient response for various rare-earth-doped fibers as a function of the inverse of $P_{sat}$, illustrating the linear relationship between these two parameters. The transient response, denoted dG/dt, is shown for a variety of standard erbium-doped fibers, where each exhibits a transient response of 0.25 dB/us or greater. In contrast, a doped fiber formed in accordance with the present invention is shown to have a transient response on the order of 0.19 dB/us, with an inverse $P_{sat}*t$ value of about 0.13 $(mW*ms)^{-1}$.

Figure 4:
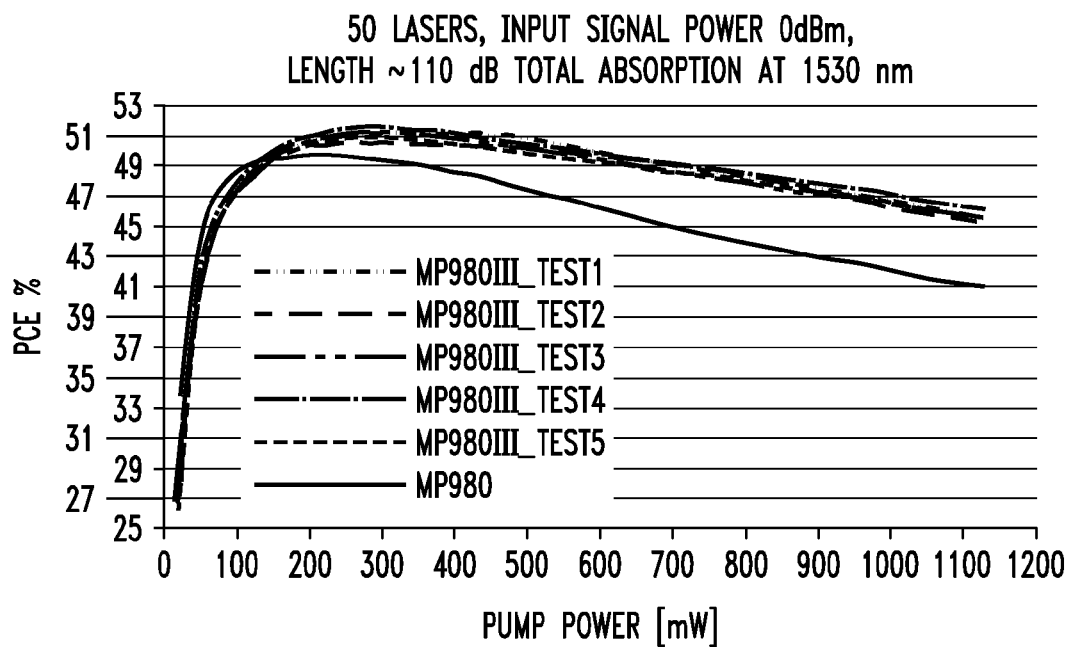
FIG. 4 is a plot of power conversion efficiency (PCE) for a prior art doped fiber amplifier and a doped fiber amplifier formed in accordance with the present invention.

FIG. 4 illustrates the improvement in power conversion efficiency (PCE) with the rare-earth-doped fiber of the present invention, where this graph plots PCE % as a function of pump power. As shown, for pump powers exceeding about 200 mW, the increase in efficiency for the inventive design as compared to a conventional doped fiber is significant. For example, at an input pump power on the order of 700 mW, the efficiency of a conventional doped fiber is about 45%, while the fiber of the present invention (with the enlarged core and rare-earth doped inner cladding portion) exhibits an efficiency closer to 49%. The marginal increase in efficiency is even greater for higher pump power values.

Figure 5:
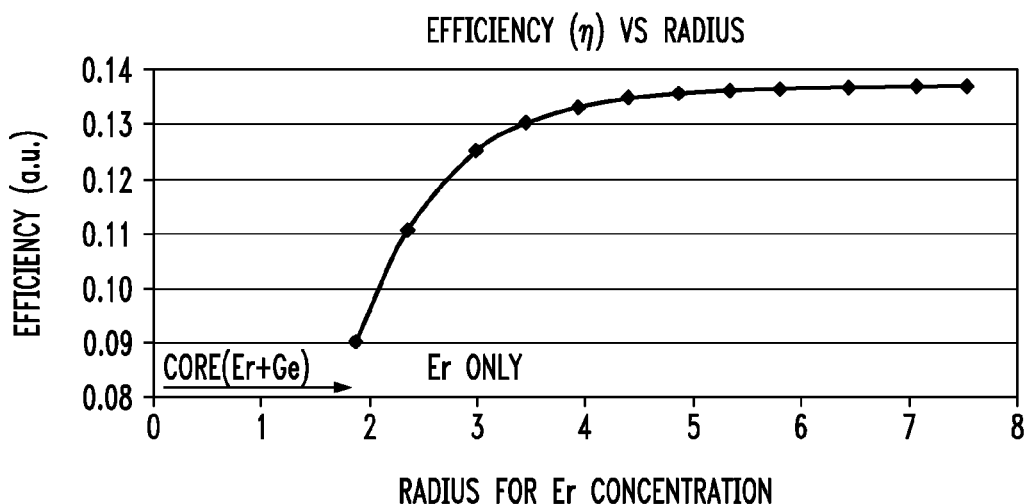
FIG. 5 is a plot of an increase in efficiency (as a function of fiber radius) for a doped fiber amplifier of the present invention.

As mentioned above, the efficiency has been found to be a strong function of the overlap (Γ) between the pump, the optical signal and the rare-earth doped region. FIG. 5 is a plot of an increase in efficiency as a function of radius for an exemplary fiber of the present invention that is formed to have an enlarged core radius of 2 μm, the core being co-doped with both Ge and Er. As shown, by extending the presence of erbium into the trench area of the cladding, the efficiency will increase. That is, if the erbium dopant extends outward beyond the boundary of the core (for example, beyond a 2 μm core radius an additional 2 μm into the trench), the efficiency dramatically increases to a value greater than 0.13.

Figure 6:
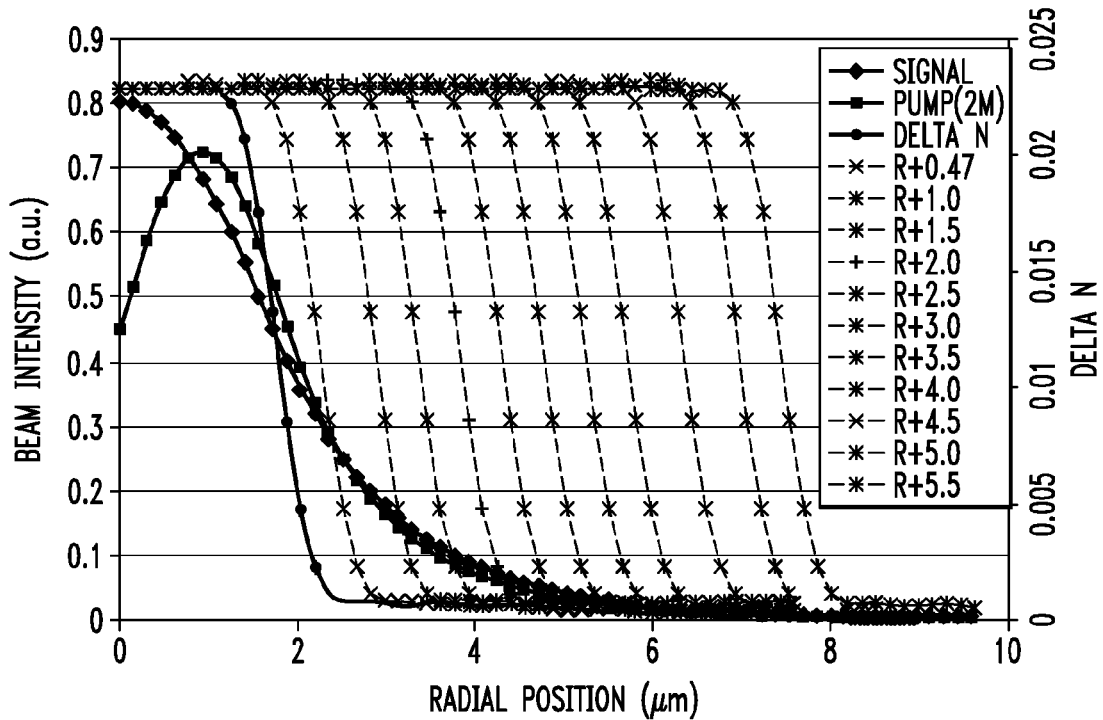
FIG. 6 is a plot showing intensity profiles for an input signal and a pump signal.

FIG. 6 is a plot showing the intensity profiles of an input signal (at 1550 nm, for example) and an exemplary pump (the intensity profile of the pump being a combination of the two strongest modes of the pump—the $LP_{01}$ fundamental mode and the $LP_{11}$ higher-order mode). Presuming for this case that the doped fiber is formed to exhibit a core diameter of 4 μm (the minimal value for the design of the present invention), it is clear that a significant portion of the energy in both the signal and pump reside outside of the core and extend into the trench area of the structure.

Also shown in FIG. 6 is a refractive index profile (ΔN) for various erbium dopant concentrations that may be utilized to perform additional amplification within the trench portion of the fiber structure. As shown above, the presence of erbium in the trench portion of the cladding region significantly increases the efficiency of the amplification by utilizing the pump and signal lights present in the trench. It has been found that the inclusion of erbium dopant into a region of 0.5 μm beyond the core may lead to an increase in efficiency of about 20%.

While this increase in efficiency is a useful result, the presence of the erbium in the cladding also affects the refractive index value of the cladding. In particular, the presence of a rare earth dopant may increase the refractive index of the trench (an undesirable result). Thus, in certain arrangements it may be useful to include a dopant (such as fluorine) in at least a portion of the trench to provide a corrective action to its refractive index value.

Figure 7:
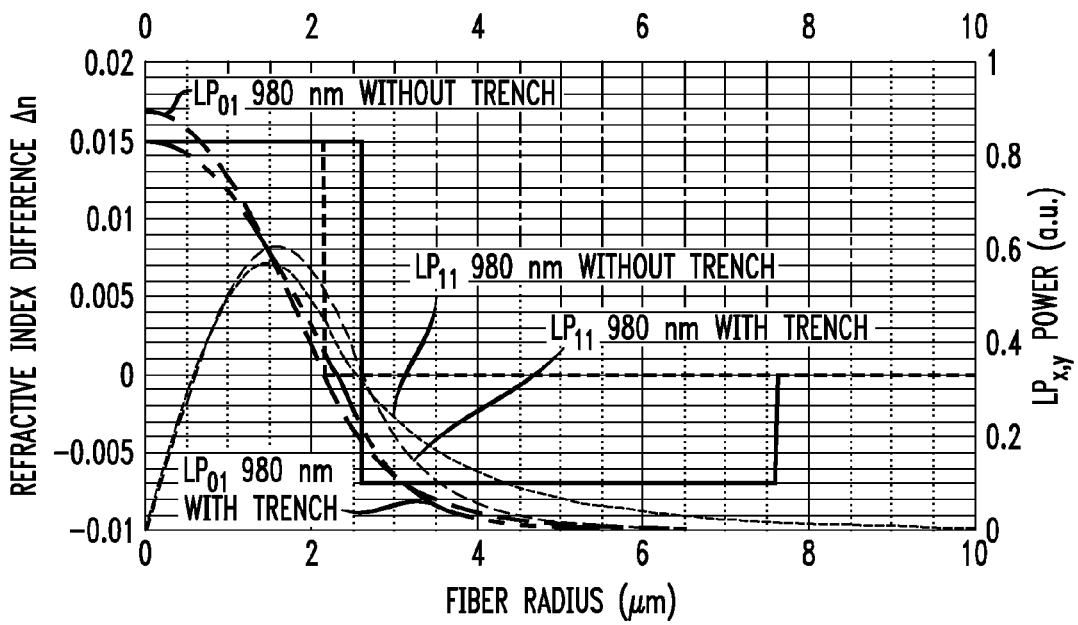
FIG. 7 is a plot contrasting available pump power in a convention doped fiber amplifier and a fiber structure of the present invention.

FIG. 7 is a plot illustrating the differences in pump power between a conventional doped fiber structure and a fiber structure formed in accordance with the present invention. The plot illustrates the refractive index profiles for a conventional doped fiber structure (having a radius of 2 μm and a refractive index difference Δn of 0.014). The conventional fiber then includes a cladding region that extends beyond the core, the cladding have a refractive index difference Δn of 0.0. For this conventional design, the power in fundamental mode of the pump signal drops by more than 50% at the interface between the core and cladding, tailing off to zero within an additional 2 μm of the cladding. The power of the higher-order $LP_{11}$ pump signal is shown to peak at about the 1.5 μm region within the core, with a significant amount of the power present in the cladding structure. With the conventional design (which does not include any rare earth dopant in the cladding), this pump signal within the cladding remains unused.

The refractive index profile of a doped fiber formed in accordance with the present invention is also shown in FIG. 7, where in this case the core region (which also has a Δn value of 0.014), is shown to have a radius that extends outward another half micron when compared to the conventional fiber. A trench region is also shown, which extends from about 2.5 μm to 7.5 um in this example. The Δn value for the trench is shown to be on the order of −0.0075. An outer cladding region, having a Δn of 0.0 is also shown.

The resultant modifications in pump power for the doped fiber design of the present invention are also shown in this diagram. The fraction of the $LP_{01}$ mode which remains in the core region for the inventive fiber is about 95%, compared with a value of 88% for the conventional fiber. This increase in power fraction thus increases the $P_{sat}$ value and reduces the transients associated with fluctuations in input signal (channel) power.

Figure 8:
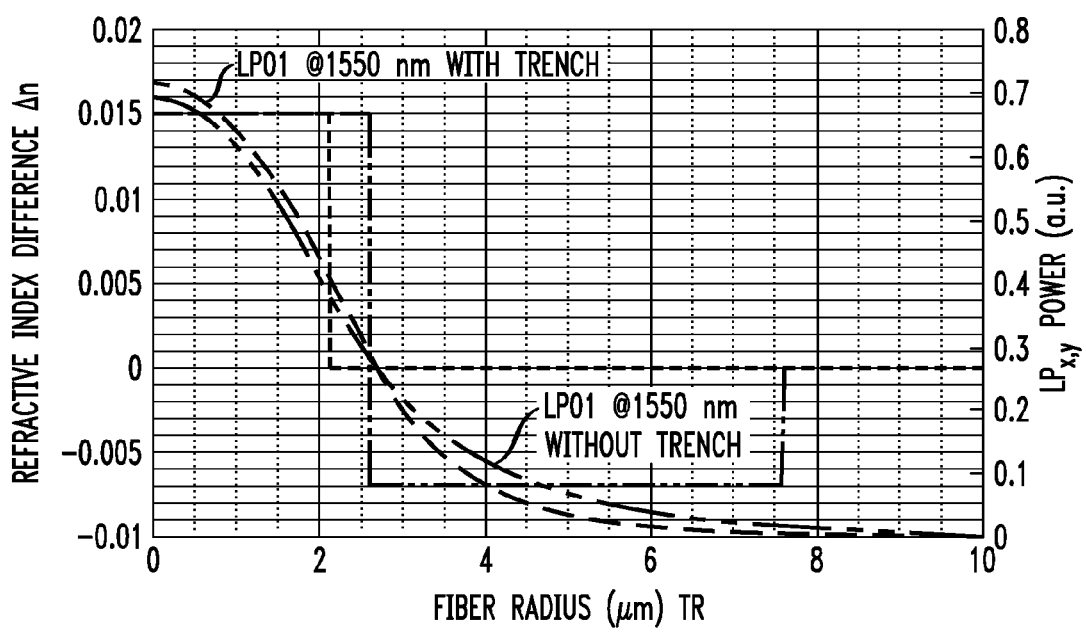
FIG. 8 is a plot of the same two refractive index profiles, in this case for a conventional doped fiber and a fiber formed in accordance with the present invention.

FIG. 8 is a plot of the same two refractive index profiles—for a conventional doped fiber and a fiber formed in accordance with the present invention. In this diagram, the signal power (in the 1500 um input signal) is shown. Again, increasing the width of the core and adding the doped trench region is shown to increase the signal power available in the core—an increase from 66% to 85%.

Thus, as shown, the doped fiber of the present invention achieves low transients without compromising other properties of a doped fiber amplifier (e.g., power conversion efficiency, absorption per unit length), thereby minimizing fluctuations in output power associated with channel switching or changes in the input signal power to the doped fiber amplifier. All of this results in a more efficient control of transients in the amplification process.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An amplifying optical fiber comprising
   a rare-earth-doped core region of a diameter d greater than 4.0 μm and exhibiting a first refractive index value $n_{core}$;
   a trench disposed to surround the core region, the trench having a second refractive index value $n_{trench} \ll n_{core}$ and at least an inner portion of the trench is formed to include a rare-earth dopant; and
   a cladding disposed to surround the trench, the cladding having a third refractive index value $n_{clad}$, where $n_{trench}$ is maintained at a value less than clad by including an index-increasing dopant in the cladding.

2. An amplifying optical fiber as defined in claim 1 wherein the rare-earth dopant concentration in the inner portion of the trench decreases in value from the core region towards the cladding.

3. An amplifying optical fiber as defined in claim 1 wherein the value of d is selected to provide a predetermined saturation power value $P_{sat}$.

4. An amplifying optical fiber as defined in claim 3 where 4 μm<d<10 μm.

5. An amplifying optical fiber as defined in claim 1 wherein the values of w and $n_{trench}$, and the width $w_i$ of the inner portion of the trench are selected to create a predetermined absorption of the rare-earth dopant.

6. An amplifying optical fiber as defined in claim 1 wherein the rare-earth dopant is selected from a group consisting of: erbium, ytterbium and neodymium.

7. An amplifying optical fiber as defined in claim 1 wherein the cladding contains a dopant selected from the group consisting of: fluorine, aluminum and germanium.

* * * * *